United States Patent [19]
Losack

[11] Patent Number: 5,265,978
[45] Date of Patent: Nov. 30, 1993

[54] METHOD FOR IN SITU CLEANING OF CONTAMINATED SOIL

[75] Inventor: Billy J. Losack, Hondo, Tex.

[73] Assignee: Tuboscope Vetco International, Inc., Houston, Tex.

[21] Appl. No.: 934,111

[22] Filed: Aug. 20, 1992

[51] Int. Cl.⁵ .............................................. B09B 1/00
[52] U.S. Cl. ..................................... 405/128; 134/21; 405/131; 405/258
[58] Field of Search ................ 405/128, 129, 131, 258; 134/13, 14, 21; 166/248; 210/747, 751, 610; 175/66, 206

[56] References Cited

U.S. PATENT DOCUMENTS

| | | | |
|---|---|---|---|
| 3,016,345 | 1/1962 | Price . | |
| 4,183,407 | 1/1980 | Knopik . | |
| 4,469,176 | 9/1984 | Zison et al. | 405/129 X |
| 4,593,760 | 6/1986 | Visser et al. . | |
| 4,660,639 | 4/1987 | Visser et al. . | |
| 4,670,148 | 6/1987 | Schneider | 405/129 X |
| 4,730,672 | 3/1988 | Payne et al. . | |
| 4,752,402 | 6/1988 | Gray . | |
| 4,842,448 | 6/1989 | Koerner et al. | 405/128 X |
| 4,890,673 | 1/1990 | Payne et al. . | |
| 4,919,570 | 4/1990 | Payne | 405/128 |
| 4,945,988 | 8/1990 | Payne et al. . | |
| 4,984,594 | 1/1991 | Vinegar et al. . | |
| 5,067,852 | 11/1991 | Plunkett | 405/128 |
| 5,114,497 | 5/1992 | Johnson et al. | 405/128 X |

*Primary Examiner*—Dennis L. Taylor
*Attorney, Agent, or Firm*—Finnegan, Henderson, Farabow, Garrett & Dunner

[57] ABSTRACT

An in situ, on-the-ground method of cleaning contaminated soil comprises breaking and piling up contaminated soil, placing the broken soil in a substantially enclosed on-the-ground system and circulating air under pressure to promote an increase in temperature which aids the oxidation, vaporization and gasification of the contaminants and substantially harmless metabolic products thereof produced by indigenous microorganisms, extracting any gases or vapors comprising the contaminants and metabolic products thereof from the now substantially decontaminated soil under vacuum, filtering the thus extracted gas- or vapor-containing air to separate clean air from the contaminants, and return it to the environment or recycle it, and returning the decontaminated soil to the environment.

7 Claims, 1 Drawing Sheet

METHOD FOR IN SITU CLEANING OF CONTAMINATED SOIL

BACKGROUND OF THE INVENTION

1. Field of the Invention

This invention relates to an in situ method of cleaning contaminated soil that relies on the metabolism of the contaminants by indigenous soil microorganisms. Briefly, the method comprises breaking up contaminated soil, placing the broken soil in a substantially enclosed on-the-ground system where air is circulated, providing oxygen under pressure to the broken soil to promote the oxidation of contaminants to increase the temperature of the broken soil and vaporize any contaminants, extracting any gases or vapors from the soil by means of a low pressure air flow, filtering the gas-containing air to separate clean air from the gases or vapors and returning the decontaminated soil to the environment. The present technology shortens clean-up time from, e.g., about five years to five months. The friction created by the circulation of air of any source of oxygen increases the soil's temperature and aids the metabolism of contaminants and their removal. In addition, microorganisms grow better when air and moisture are provided, and this also increases the degree of contaminant biodegradation. The biodegraded contaminants, in turn, may be loosened up from the soil, and transformed into a gas or vapor for removal.

2. Description of the Background

Increasingly, spills and landfills of toxic and carcinogenic materials occur in the soil. If left in place, many of these contaminants find their way into aquifers or into the food supply, and could become public health hazards.

Prior methods proposed for removal of soil contaminants include excavation followed by incineration, in-situ vitrification, bacterial attack, addition of deactivating chemical additives, radiofrequency heating, etc. Although successful in some applications, these methods may be very expensive costing, e.g., hundreds of dollars per ton of soil being decontaminated, and are not practical if many tons of soil are to be treated.

In U.S. Pat. No. 4,670,634, Bridges et al propose a method for in-situ decontamination of spills and landfills by radiofrequency heating. The soil is heated by radiofrequency energy to a temperature higher than that needed to boil water. This is said to increase the permeability of the soil. A vapor and gas collection and containment barrier is installed above the region of the soil to be decontaminated. The heating is continued by dielectric heating after water has boiled from at least a portion of the region so as to heat the portion to elevated temperatures substantially above the boiling point of water. The material is treated in-situ by pyrolysis, thermally-assisted decomposition, distillation, or oxidation. The materials may also be driven from the region, as by distillation or evaporation and steam drive, and then collected and disposed of by incineration.

U.S. Pat. No. 4,670,634 is a significant advance relative to previous remediation methods. However, this patent also presents various disadvantages. The use of radiofrequency power in the MHz range makes the process hard to control as the soil dries out. It results in less uniform heating because of "hot spots" which are overheated every half wavelength and "cold spots" which are underheated. It results in a loss of efficiency in the generation of radiofrequency power. In addition, it emits electromagnetic noise that can interfere with radio communications. Also, because the process of this prior art patent is operated near atmospheric pressure, it requires cumbersome vapor collection barriers at the surface.

Other methods have been previously used to remove industrial pollutants from the vadose zone of the soil. The most common of these methods is excavation, in which all of the contaminated soil is removed and eventually replaced with fresh earth. While excavation is a relatively simple process, it is not practical when large volumes are involved due to prohibitive cost and time factors.

Another method involves a circulation system for leaching contaminants from the vadose layer into the water table where they are recovered by a water removal well and a pump. This process is shown generally in U.S. Pat. No. 4,167,973. Such processes are not always successful due to the low water solubility of most common industrial pollutants, which results in a lengthy and often costly recovery.

A third method involves the creation of a vacuum within a withdrawal well in the vadose zone. The contaminants are urged towards the withdrawal well by injecting air into the soil at points surrounding the withdrawal well where they are vaporized and collected by vacuum withdrawal. Such method is described in U.S. Pat. Nos. 4,183,407 and 4,593,760. These methods are generally effective in the recovery of some contaminants but do not provide for the satisfactory disposal of most contaminants.

Another method for collecting volatile contaminants is that provided by U.S. Pat. No. 4,730,672. This method utilizes a closed-looped device including one or more withdrawal wells surrounded by multiple air reinjection wells connected by a conduit. The volatilized contaminants are drawn through the withdrawal well(s) to the connecting conduit where it is (are) captured or neutralized. Residual air from the withdrawal well is replaced into the ground through the air injection wells to encourage further contaminants to move toward the withdrawal well(s) for collection.

Still another method is provided by U.S. Pat. Nos. 4,984,594 4,984,594; 4,730,672 and 4,890,673. These patents provide an in situ method for removing contaminants that applies vacuum to the soil under an impermeable flexible sheet while heating the soil with an electric surface heater positioned on the soil surface under the sheet. The heater is permeable to vapors emanating from the soil when heated. A permeable mat separates the heater from the impermeable sheet and provides a conduit for vapors flowing to openings provided in the sheet. The openings are connected to a vacuum manifold that facilitates the collection of the vapors. The region under the impermeable sheet is evacuated with a vacuum pump and the soil contaminants are removed by vaporization, steam distillation and/or thermal decomposition.

Filtration is also a common means for separating solids from liquids, usually involving forcing a slurry or mixture of solids and liquids through filtering materials. A slurry is taken to mean a watery suspension or mixture of insoluble solids in a liquid. It encompasses mixtures or suspensions of solid materials comprising particulate matter, gels, sludges and the like, which are at least partially insoluble in a liquid component comprising water, liquid organic or inorganic materials, and mixtures thereof. Such slurries can contain solids that remain in suspension, as well as those that tend to settle naturally with time. Normally, the filtrate or liquid passes downward through the filter with the solids remaining on the filter for recovery.

In many industries, e.g., the mining, oil, chemicals, wood pulp and agricultural industries, unfiltered waste slurries of liquids and solids are placed in dammed earthen areas or "settling ponds", which are concave depressions in the ground, lined or unlined, used to collect slurries of solids and liquids. Generally, such slurries are collected in settling ponds for separation, disposal or other processing. It is desirable to minimize the area of these settling ponds, to maximize disposal rates of slurries and eventually to reclaim the areas including landfills and the like. However, often these areas never dry nor solidify, since evaporation is slow, and the slurried or flocculated solids never settle sufficiently so that the liquids can be pumped off. Effective means for dewatering such settling ponds without removing the sediment or settled solids are thus desirable.

Still another method is provided by U.S. Pat. No. 3,016,345. This method removes contaminants, including solids and liquids such as water particles, from a hydrocarbon liquid by separating out solid materials and increasing the static electrical charges on the water particles, then neutralizing the electrical charges and coalescing the water particles to propagate their size and separating the water from the hydrocarbon liquid.

Still another method of separating liquids from solids contained in slurry sludges, etc., is the one provided by U.S. Pat. No. 4,752,402. This method forces a liquid-permeable fabric downward into a slurry so that solid materials are retained below the liquid-permeable fabric and liquids may be pumped or drained from above the liquid-permeable fabric.

Other processes such as those disclosed by U.S. Pat. Nos. 4,593,760, 4,660,639 and 4,730,672 involve the injection of air into a vadose zone to urge the contaminants toward a withdrawal well.

A process for removing contaminants from an aquifer itself is shown in U.S. Pat. Nos. 4,183,407 and 4,809,673. The process disclosed in the latter teaches the injection of atmospheric air into the aquifer to urge the contaminant out of the aquifer and into the vadose zone toward a withdrawal well. This process is commonly referred to as sparging. One major drawback to sparging is the stimulation of bacterial growth or the formation of inorganic precipitates in the aquifer saturated zone or by injection of oxygen thereinto.

Still another process for removing and disposing of or neutralizing volatile contaminants in a below ground aquifer is shown by U.S. Pat. No. 4,945,988. The process includes the injection of substantially oxygen free air into the aquifer to retard the formation of aerobic bacteria and the injection of oxygen rich air into the vadose zone to stimulate bacterial growth and increase the recovery of contaminants. The volatilized contaminants are extracted from the soil by means of withdrawal wells that terminate in the vadose zone.

The Environmental Protection Agency (EPA) has targeted over a thousand sites for Superfund cleanup. Yet, up to the present time only a fraction of the sites are being partially cleaned up. According to the U.S. News & World Report, the cost, so far, has been a staggering $4 billion.

Accordingly, there is still a need for an effective method for in situ decontaminating soil that is simple and fast while at the same time being capable of reducing the level of contamination to an environmentally acceptable value.

SUMMARY OF THE INVENTION

This invention provides an in situ, on-the-ground method of cleaning contaminated soil, comprising breaking up contaminated soil;

placing the broken soil in a substantially enclosed on-the-ground system and circulating air therewithin under pressure to promote an increase in temperature which aids the oxidation, gasification and vaporization of the contaminants and metabolic products thereof produced by indigenous microorganisms;

extracting any gases or vapors comprising the contaminant and the metabolic products thereof from the soil under vacuum within the enclosed system;

filtering the thus extracted gas- or vapor-containing air to separate clean air from the contaminants and returning the clean air to the environment or recycling it; and returning the decontaminated soil to the environment.

A more complete appreciation of the invention and many of the attendant advantages thereof will be readily perceived as the same becomes better understood by reference to the following detailed description when considered in connection with the following drawings.

BRIEF DESCRIPTION OF THE DRAWING

The FIGURE shows the location of the sample points in one possible diagram of the pipe system in the above ground system for practicing the method of the invention. Contaminated soil is broken up and stockpiled (1) and two pipe systems installed therewithin. A pressurized system (2) conveys clean air to the soil and a vacuum system (3) extracts contaminated air, that is put through various filters in series (4) prior to being recirculated into the stockpile. An air flow (5) provides the circulating air. Samples were taken from the stockpile for analysis at depths of 3 feet (6) and 6 feet (7).

Other objects, advantages and features of the present invention will become apparent to those skilled in the art from the following discussion.

DESCRIPTION OF THE PREFERRED EMBODIMENTS

Figure 1:
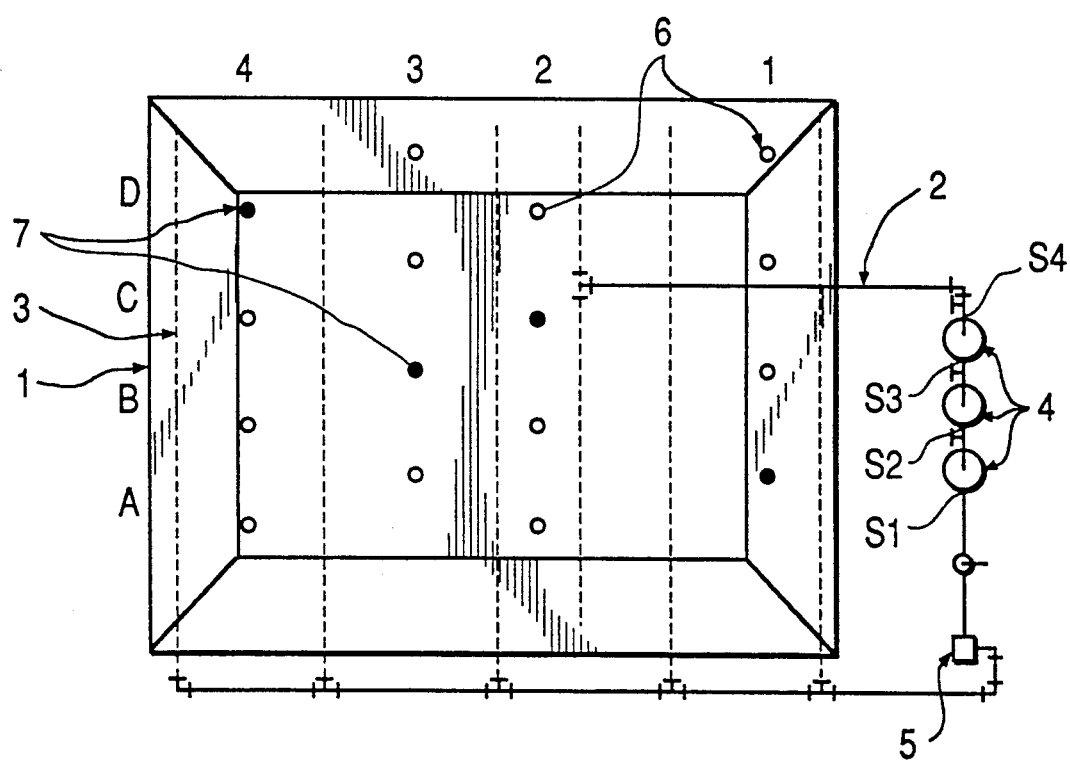

This invention arose from a desire by the inventor to provide an improved method for cleaning contaminated soil such as that resulting from spills of industrial waste, including solvents such as halogenated solvents and light hydrocarbon materials, that is simple, economical and efficient without the cumbersome drawbacks of other methods. This patent provides an in situ, on-the-ground method for decontaminating soil in a short period of time. The decontaminated soil may then be replenished into the environment. The method of this invention is particularly suitable for the clean up of small contaminant concentrations and/or limited surface areas of contamination.

The invention provides a fast and simple method for treating soil contaminated with a variety of chemicals such as light molecular weight hydrocarbons, light molecular weight halogenated derivatives thereof, and light molecular weight solvents, among others. This invention reduces the time necessary for clean up of a particular volume of soil by endogenous microorganisms by up to about 40%, and in many instances by up to about 60%, and higher. This method, however, is far less expensive than other methods utilizing comparable technology. The practice of this method, in addition, avoids liabilities stemming from the old practice of landfilling.

The method of this invention offers a variety of advantages when compared to other soil treatment methods known in the art.
 (a) Significant cost savings over thermal treatment or off-site land-filling.
 (b) No exogenous microorganisms are required, but may be added.
 (c) Lack of liability associated with landfilling.
 (d) Treatment time is substantially shorter than for other processes.

The method of the invention is based on the utilization of a light vacuum-high pressure combination system, where forced air is placed in contact with broken soil in a substantially enclosed system. The friction created by the circulating air slightly increases the temperature in the environment surrounding the soil to make the decomposition of the various contaminants proceed at a faster pace. The availability of oxygen from the air or other sources increases the activity of indigenous aerobic microorganisms and potentiates the biodegradation of soil contaminants.

What is provided herein, therefore, is an in situ, on-the-ground method for cleaning contaminated soil, that comprises
 breaking up contaminated soil;
 placing the broken up soil in a substantially enclosed on-the-ground system and circulating air under pressure to promote an increase in temperature which aids oxidation, gasification or vaporization of the contaminants into substantially harmless metabolic products thereof produced by indigenous microorganisms;
 extracting any gases or vapors comprising the contaminants and metabolic products thereof from the soil under slight vacuum within the enclosed system;
 filtering the thus extracted gas- or vapor-containing air to separate substantially clean air and returning the air to the environment or recycling it; and
 returning the decontaminated soil to the environment.

In a particularly preferred embodiment of the present method, the oxygen is provided as air, and it is provided under pressure, and preferably at a pressure of about 1 to 100 lbs/in$^2$, and more preferably about 5 to 90 lbs/in$^2$. The air may circulate in a closed circuit where air from the environment is forced through a pipe system provided with openings into the soil compartment and air, and gaseous or vapor contaminants are removed therefrom under slight vacuum by a separate pipe system provided with openings. Both pipe systems may be connected to and operated by the same pump means.

When the air is circulated within the system, enough friction occurs to provide a slight increase in the temperature to above ambient temperature. This helps the gasification and/or vaporization of the contaminants and their oxidation and/or breakdown into substantially harmless metabolic products by the indigenous soil microorganisms.

The vacuum provided may be of the order of about 1 to 20 inHg, and more preferably about 3 to 12 inHg.

In another aspect of the invention, microorganisms of different types or mixtures thereof, may be added for an extra strong treatment of any specific type of contaminant. Microorganisms suitable for this purpose are known in the art and need not be further described herein. For example, the microorganisms include thermostable and/or thermophilic microorganisms capable of biodegrading hydrocarbons, halogenated derivatives thereof, solvents, and other soil contaminants may be utilized. This addition further contributes to the metabolism of the contaminants, over and above that which occurs by the presence of aerobic and anaerobic indigenous microorganisms.

In another aspect of the invention, the thus extracted gas- or vapor-containing air may be further filtered through a filtering material such as carbon, gravel, sand, and the like, supported by a filter plate. Particularly preferred is a filter plate with alternate perpendicular substantially linear openings disclosed in co-filed, co-pending application by the inventor entitled "Filter Plate for Removing Hydrocarbons and Other Contaminants From Aqueous Solutions and Gases", the pertinent text being incorporated herein by reference.

In another preferred embodiment, a cascade of filtering means is provided in order to increase the degree of decontamination and filtration attained.

In a particularly suitable embodiment of the invention, the soil is broken up, shaken and provided to the on-the-ground system by means of a conveyor belt.

Preferred conditions for the practice of the method are ambient temperature and sufficient moisture being maintained at the on-the-ground site for the microorganisms to thrive, grow and degrade the contaminants. In another preferred embodiment, a desired level of moisture is attained by sprinkling the soil with water or by providing moisturized air.

Once the filtered air is substantially clean, it may be recirculated into the high pressure air flow to provide oxygen for the aerobic microorganisms lodged in the soil. Alternatively, the decontaminated air may be returned to the environment.

When being broken up, the soil may be reduced to a particle size of less than about 1 inch by means known in the art. Suitable means for breaking up soil are blades, strippers, tillers, hoes, disks, and the like. However, other means may be utilized to reach lower particle sizes, if so desired.

The method described herein has been shown to achieve a substantial contaminant reduction within a period of a few months. In one instance, the present method reduced the presence of gasoline in about 200 yds$^3$ of soil from, e.g., about 2,600 ppm to undetectable amounts, in a period of three months.

One of the most advantageous aspects of the present method is that it may be carried out in situ and on-the-ground, thereby eliminating transportation as well as deep soil excavation costs, and reducing drastically the time necessary for completing a job.

Typically, layers of plastic or other commercially available materials may be used for the substantially enclosed system. The broken up soil may be piled up on one of the layers to a certain depth, the pipes provided with apertures installed within the pile and connected to one or more pumps, and the pile covered with another layer of material. The forced air may be pumped into the soil within the enclosure through the pipe system provided with apertures that permit the exit of the air. The pipe is placed in contact with the soil and any indigenous microorganisms lodged therewithin. Another pipe system may be provided within the enclosure to circulate the air with the contaminants out of the enclosure under light vacuum. This pipe may also be provided with apertures. In addition, both pipe systems may be operated by one pump. The vacuum-extracted, contaminated air may be further subjected to a separation of contaminants from the air.

In a further embodiment, an additive and water may be added to the soil for greater effectiveness. The additive may be $H_2O_2$, organic peroxides, or an $H_2O_2$-generating system such as humic acid and a fertilizer-like material comprising nitrogen, phosphorus and potash, among others, as described in a co-filed, co-pending U.S. application by the present inventor entitled "Method and Apparatus for on the Site Cleaning of Contaminated Soil", the pertinent text being incorporated herein by reference.

The additive may be suitably prepared to a concentration of about 10 to 70% in an aqueous medium, and more preferably to about 30 to 60%. The additive may be added in a proportion of 0.1 to 10 gallons per 8 yds$^3$ soil, and more preferably about 5 gallons per 8 yds$^3$ soil. However, other amounts may also be utilized.

The method may be practiced until the content of the contaminant in the soil is reduced to below a desired level. Soil samples may be tested at different intervals of time to follow the contaminant reduction by tests known in the art. Most typically, soil testing may be left to professional laboratories that perform standardized tests for different contaminants, in an extremely reliable manner as is known in the art.

Having now generally described this invention, the same will be better understood by reference to certain specific examples, which are included herein for purposes of illustration only and are not intended to limiting of the invention or any embodiment thereof, unless so specified.

EXAMPLES

Example 1: Excavation of Site and Soil Testing

The testing of soil surrounding two 10,000 gal. fuel tanks located at a commercial site in Louisville, Ky., indicated that strong leaks of fuel had occurred. The two tanks were removed, and soil samples taken from the excavation of the site tested. Contamination levels were found that ranged from non-detectable (ND) to 35 parts per billion (ppb) for benzene, from ND to 100 ppb for toluene, from ND to 16,000 ppb for ethylbenzene and from ND to 66,000 ppb for xylene.

The tank holes were then fully overexcavated. The digging was directed to areas showing higher contamination, as indicated by a HNU photoionizer, and when the head sampling of the soil from the excavation walls indicated a contamination of less than about 30 ppm, the overexcavation was stopped.

About 681 yds$^3$ of soil were removed during the overexcavation work. This soil was stockpiled on a plastic sheet located adjacent to the commercial establishment. The approximate dimensions of the pile were 35 feet $\times$ 35 feet $\times$ 15 feet.

Example 2: Aereation of Piled up Soil

Two separate networks of slotted two inch iron PVC pipes were installed in the stockpiled soil and designed as input and output networks. The two sets of pipes were positioned horizontally approximately 2 to 4 feet above ground. After installation, the two pipe networks were covered with excavated soil, and a second plastic sheet was placed on top of the piled soil.

The air intake network was then connected to a manifold, which in turn was connected to an air pump. The air pump extracted air from the intake network and forced it through three activated carbon vessels positioned in series to filter the air. The filtered air coming out of the vessels was then fed into the output network and pumped back into the pile of soil.

This system created an air circulation pattern in the pile of soil that increased the evaporation, e.g., gasification and/or vaporization, of any soil contaminants, and therefore, decreased the soil's overall contamination level. The FIGURE accompanying this patent shows a diagram of the two networks.

In addition to the above, a cover was placed onto the air blower apparatus utilized for providing air to the system, the plastic cover over the stockpile was sealed with a dirt brim, and fence was placed around the stockpile.

Thereafter, the aereation system was operated continuously 24 hours-a-day at the site of the spill.

Example 3: Results Obtained

The air going into the stockpile and coming out of the filtration vessels was tested for volatile organic components. This testing was done with an HNU photoionizer. Sample locations were designated S1 for air entering the first vessel, S2 for air entering the second vessel, S3 for air entering the third and last vessel and S4 for air exiting the last vessel.

The testing started on the first day of treatment, at which time, the HNU readings indicated for volatile organics the following values.

S1 = 33,250 ppm
S4 = 0 ppm

As the treatment continued, the contamination level at S1 gradually decreased while the S4 value remained at 0 ppm.

On the ninth day of treatment, the HNU reading indicated for volatile organics the following values.

S1 = 223 ppm
S4 = 0 ppm

Approximately 50 days after the commencement of treatment, ten soil samples were obtained from the soil pile using a stainless steel auger. These samples were submitted to an outside laboratory for analysis using EPA Method 0820/AHS for benzene, toluene, ethylbenzene and xylene (BTEX), and EPA Method 3540/418.1 for Total Petroleum Hydrocarbons (TPH).

The results obtained indicated BTEX levels of less than about 0.4 ppm for all the samples and TPH levels of about 10 to 54 ppm. The samples were taken at different pile heights, e.g., 3 feet and 6 feet deep. Approximately 70 days after treatment was initiated, 16 more soil samples were collected from the stockpile. These samples were submitted to a different outside laboratory for TPH analysis using EPA Method 8015 (Modified FID). The results evidenced about 0.5 to 0.62 ppm TPH contamination.

Example 4: Conclusions

The level of contamination was successfully lowered at the site of excavation as shown above. Laboratory test results showed that after 70 days of treatment, levels of less than about 0.5 to 0.62 ppm TPH were attained. These levels are substantially below the original level of TPH in the contaminated soil, and are within an acceptable range. Because of the readings obtained for the TPH contamination, it was recommended that the treatment be stopped at this point and the system dismantled.

It was recommended that the stockpiled soil be disposed of by spreading it on a grassy lot adjacent to the commercial site. The soil may then be reseeded with grass.

The used carbon from the filtration vessels was disposed of properly in accordance with recommended safeguards.

The invention now being fully described, it will be apparent to one of ordinary skill in the art that many changes and modifications can be made thereto without departing from the spirit or scope of the invention as set forth herein.

I claim:

1. An in situ, on-the-ground method of cleaning contaminated soil, comprising
   breaking up contaminated soil;
   placing the broken soil in a substantially enclosed on-the-ground system and introducing and circulating air by a first pipe system therewithin under pressure to produce friction between the air and broken soil to cause an increase in temperature of the broken soil to produce oxidation, gasification and vaporization of soil contaminants and metabolic products thereof produced by indigenous microorganisms;
   extracting by a second pipe system any gases or vapors comprising the contaminants and metabolic products thereof from the broken soil under vacuum within the enclosed system;
   filtering the thus extracted gases or vapors to separate clean air from any remaining contaminants and returning the clean air to the environment or recycling it; and
   returning the soil from which contaminants have been removed to the environment.

2. The method of claim 1 wherein the air is introduced by said first pipe system at a pressure of about 1 to 100 lbs/in$^2$.

3. The method of claim 1 wherein the gases or vapors are extracted by said second pipe system under an about 1 to 20 mmHg vacuum.

4. The method of claim 1, further comprising filtering the extracted gases or vapors through a filtering material provided in said second pipe system, said filtering material being selected from the group consisting of gravel, carbon, ionic resins and sand.

5. The method of claim 1, wherein
   the soil is broken up, shaken and provided into the on-the-ground system via a conveyor means.

6. The method of claim 1, further comprising
   recycling the filtered air into the enclosed system.

7. The method of claim 1, wherein
   the contaminant is selected from the group consisting of light hydrocarbons and halogenated derivatives thereof.

* * * * *